United States Patent [19]

Adams

[11] Patent Number: 4,838,106

[45] Date of Patent: Jun. 13, 1989

[54] POWER ASSISTANCE MEANS FOR A STEERING GEAR AND A STEERING GEAR ASSEMBLY WHICH INCLUDES SUCH MEANS

[75] Inventor: Frederick J. Adams, Clevedon, Great Britain

[73] Assignee: TRW Cam Gears Limited, Clevedon, Great Britain

[21] Appl. No.: 119,538

[22] Filed: Nov. 12, 1987

[30] Foreign Application Priority Data

Nov. 28, 1986 [GB] United Kingdom ............... 8628557

[51] Int. Cl.[4] ............................................. B62D 5/04
[52] U.S. Cl. .................................. 74/388 PS; 74/422; 180/142; 180/148
[58] Field of Search ........................ 74/388 PS, 422; 180/79.1, 142, 148

[56] References Cited

U.S. PATENT DOCUMENTS

| | | | |
|---|---|---|---|
| 3,426,863 | 2/1969 | Hanson | 180/79.1 |
| 3,944,015 | 3/1976 | Bishop | 180/148 |
| 4,214,642 | 7/1980 | Dauvergne | 74/388 PS |
| 4,408,673 | 10/1983 | Leiber | 180/148 |
| 4,580,651 | 4/1986 | Adams | 180/142 |
| 4,681,183 | 7/1987 | Oshita | 180/142 |
| 4,708,220 | 11/1987 | Noto et al. | 180/79.1 |
| 4,742,882 | 5/1988 | Shimizu et al. | 180/79.1 |

FOREIGN PATENT DOCUMENTS

| | | | |
|---|---|---|---|
| 61-160359 | 7/1986 | Japan | 180/79.1 |
| 733901 | 7/1955 | United Kingdom | 180/148 |
| 2146300 | 4/1985 | United Kingdom | 180/79.1 |

Primary Examiner—Allan D. Herrmann
Assistant Examiner—Janice Chartoff
Attorney, Agent, or Firm—Tarolli, Sundheim & Covell

[57] ABSTRACT

Power assistance mechanism for a rack and pinion steering gear assembly and an assembly which includes such mechanism includes a main rack and pinion steering gear 1 mounted on which is an auxiliary rack and pinion unit 9. The unit 9 includes an auxiliary rack bar 11, the rack of which engages with an auxiliary pinion in an auxiliary housing 10. The auxiliary pinion is rotatable by an electric motor 23 in the housing 10 to drive the auxiliary rack bar 11. The housing 10 is bolted through brackets 14 to the housing 2a of the main gear 1 while the auxiliary rack bar is coupled through a bracket 16 to the rack bar of the main gear 1. The electric motor 23 is controlled by a switch 27 in the steering input 7 to the pinion of the main steering gear 1 so that when the main rack bar is driven by rotation of the main pinion, the switch 27 is actuated to energize the electric motor and drive the auxiliary rack bar 11 in a sense appropriate to assist the displacement of the main rack bar.

15 Claims, 2 Drawing Sheets

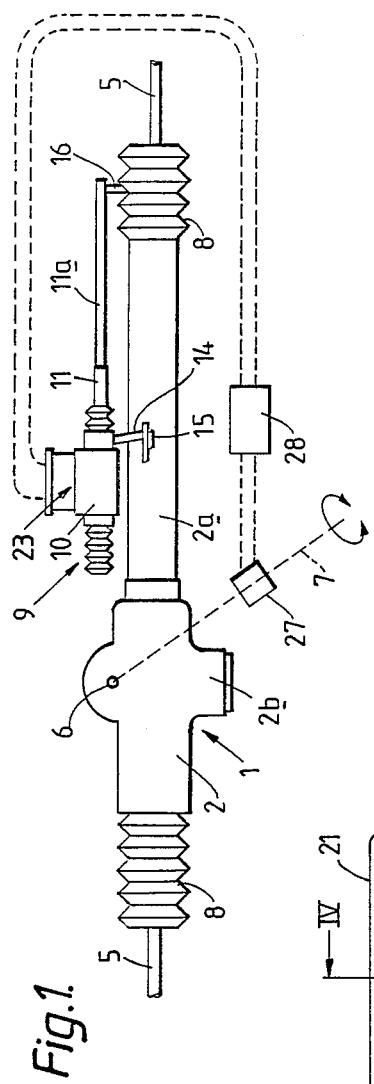
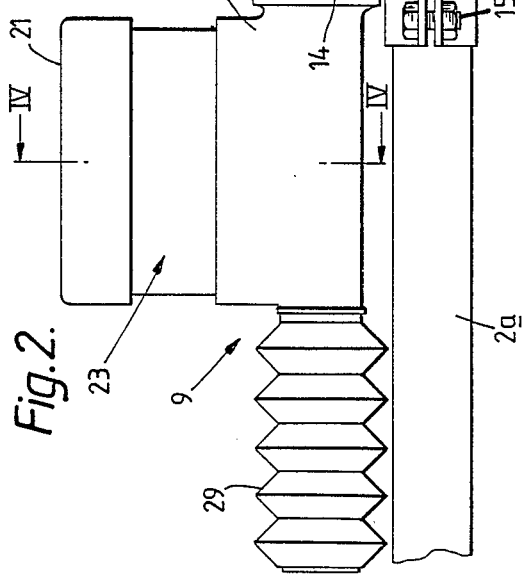
Fig.1.
Fig.2.

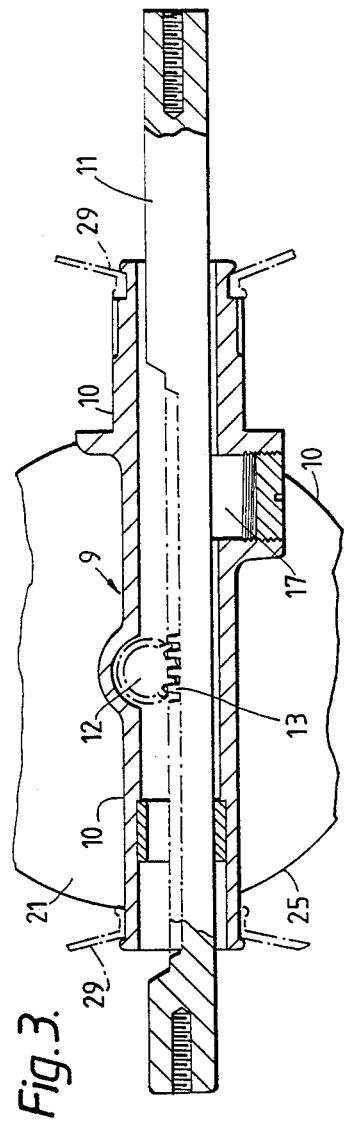
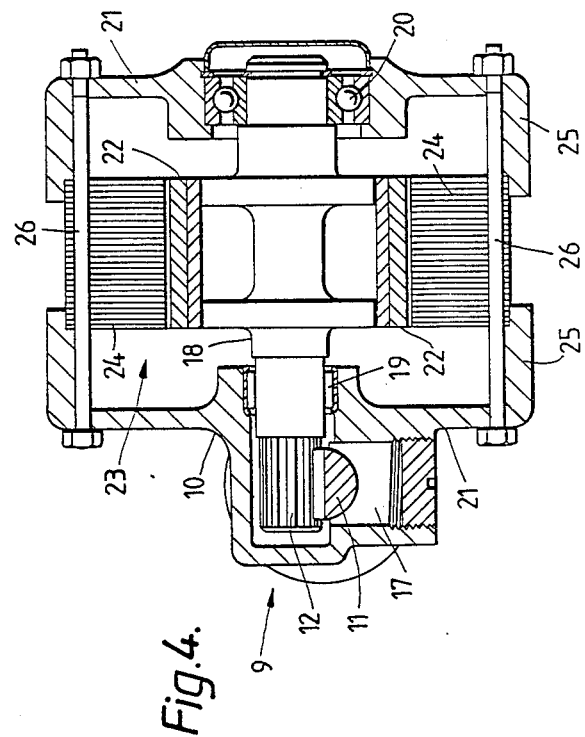
Fig. 3.
Fig. 4.

POWER ASSISTANCE MEANS FOR A STEERING GEAR AND A STEERING GEAR ASSEMBLY WHICH INCLUDES SUCH MEANS

TECHNICAL FIELD AND BACKGROUND ART

The present invention relates to power assistance means for a steering gear and a steering gear assembly which includes such means. The invention particularly concerns rack and pinion steering gears of conventional kind having a rack bar which is longitudinally displaceable in a housing, a pinion rotatably mounted in the housing and engaging teeth of the rack bar, the pinion being rotated in response to a steering input to effect in longitudinal displacement of the rack bar and thereby provide a steering output. It is well known to provide steering gears of this kind with power assistance which reacts in response to the steering input to provide appropriate assistance to displacement of the rack bar. Conventionally power assistance is provided by hydraulically operated rams or piston and cylinder devices while a more recent proposal- is the use of an electric motor, however in each instance the power assistance means is regarded as an integrel part of the steering gear. Consequently failure of the power assistance means usually calls for replacement of the complete steering gear. Furthermore, the power assistance means is usually considered as an expensive and complicated part of the steering gear with which it is integral and it is generally regarded as impractical and uneconomic to convert a manual steering gear into a power assisted steering gear; consequently when a vehicle is manufactured and a decision is taken on whether the steering gear should be manual or power assisted, that particular form of steering gear is maintained throughout the life of the vehicle. It is an object of the present invention to provide a power assistance means and a rack and pinion steering gear assembly which includes such means by which the aforementioned disadvantages may be alleviated.

STATEMENTS OF INVENTION AND ADVANTAGES

According to the present invention there is provided a power assistance means for a rack and pinion steering gear having a main rack bar longitudinally displaceable in a main housing, a main pinion rotatably mounted in the main housing and engaging teeth of the main rack bar, said pinion being rotated in response to a steering input to effect in longitudinal displacement of the rack bar, and wherein the power assistance means comprises an auxiliary rack bar longitudinally displaceable in an auxiliary housing; an auxiliary pinion rotatably mounted in the auxiliary housing and engaging teeth of the auxiliary rack bar; electric motor means carried by the auxiliary housing, said electric motor means providing a sole input drive to rotate the auxiliary pinion for displacing the auxiliary rack bar; mounting means for mounting the auxiliary housing in a fixed position relative to the main housing; coupling means for coupling the auxiliary rack bar for movement in unison with the main rack bar, and switch means for controlling operation of the electric motor means, said switch means being intended to be responsive to the steering input so that the auxiliary rack bar is driven by the electric motor means in unison with the main rack bar to provide power assistance thereto.

Further according to the present invention there is provided a rack and pinion steering gear assembly which comprises a main rack bar longitudinally displaceable in a main housing; a main pinion rotatably mounted in the main housing and engaging teeth of the main rack bar, said pinion being rotated in response to a steering input to effect in longitudinal displacement of the rack bar; power assistance means comprising an auxiliary rack bar longitudinally displaceable in an auxiliary housing, an auxiliary pinion rotatably mounted in the auxiliary housing and engaging teeth of the auxiliary rack bar, electric motor means carried by the auxiliary housing and providing a sole input drive to rotate the auxiliary pinion for displacing the auxiliary rack bar; mounting means by which the auxiliary housing is mounted at a fixed position relative to the main housing; coupling means coupling the auxiliary rack bar for movement in unison with the main rack bar, and switch means controlling operation of the electric motor means, said switch means being responsive to the steering input so that the auxiliary rack bar is driven by the electric motor means in unison with the main rack bar to provide power assistance thereto.

By the present invention it is envisaged that the power assistance means may, predominantly, be in the form of an electrically powered rack and pinion unit which can be fitted to an existing rack and pinion steering gear, either when the steering gear is built into the vehicle or subsequently when it may be considered desirable for the particular vehicle to have power assisted steering. The power assistance means may consequently be in the form of a conversion kit for sale in the after-market. The particular feature of the invention that the electric motor means provides the sole input drive to rotate the auxiliary pinion alleviates the requirement of conventional rack and pinion steering gears where the pinion is connected to be rotated by a manual input, say by rotation of a steering column; consequently the power assistance means may be fitted to an existing rack and pinion steering gear of conventional type without disturbing, to any substantial extent, the coupling between the conventional gear and the steering input. It will of course be appreciated that while the auxiliary pinion has a sole input drive provided by the electric motor means, that pinion may nevertheless be displaced in sympathy with the main rack bar in the event that the electric motor means remains inoperative during a steering manoeuvre. It will also be appreciated that the electrical system of a particular vehicle will be modified to provide power to the electric motor means under control of the switch means, the latter likely being incorporated in or on a steering column of the vehicle so that it is responsive to a steering input torque to actuate the motor in a direction appropriate for the intended steering manoeuvre. The facility for the power assistance means to be readily fitted to a rack and pinion steering gear may also permit the power assistance means to be readily replaced or removed in the event of a failure again without disturbing the basic rack and pinion steering gear of the vehicle.

DRAWINGS

One embodiment of a rack and pinion steering gear assembly constructed in accordance with the present invention will now be described, by way of example only, with reference to the accompanying illustrative drawings in which:

FIG. 1 diagrammatically illustrates the assembly with a side view of the rack and pinion steering gear and the power assistance means fitted thereto;

FIG. 2 is a side elevation in part section of part of the main rack and pinion steering gear with the electric motor means and auxiliary rack and pinion unit fitted thereto;

FIG. 3 is a longitudinal section of the auxiliary housing, auxiliary rack bar and auxiliary pinion forming part of power assistance means in accordance with the invention and incorporated in the assembly of FIG. 1, and FIG. 4 s a section on the line IV—IV of FIG. 2 and illustrates the electric motor means, auxiliary housing, auxiliary rack bar and auxiliary pinion of the power assistance means shown in FIG. 3.

DETAILED DESCRIPTION OF DRAWINGS

The assembly shown generally in FIG. 1 and partially in FIG. 2 includes a conventional form of rack and pinion steering gear 1 having a housing 2 (which includes a tubular extension 2a) within which is located a longitudinally displaceable rack bar 3. Rotatably mounted in the housing 2 is a main pinion the teeth of which engage with a rack on the rack bar 3 so that rotation of the pinion effects in longitudinal displacement of the rack bar relative to the housing 2. The ends of the rack bar 3 are coupled through ball joints 4 to tie rods 5 for connection in conventional manner as part of the steering linkage of a vehicle. The pinion of the gear 1 has a shaft 6 which is coupled to be rotated in response to a steering input from a steering column shown generally at 7. Flexible bellows 8 provide a sealed chamber between the longitudinally opposed ends of the housing 2 or 2a as the case may be and the respectively adjacent tie rod 5. A spring loaded yoke or other biasing means is provided in the housing part 2b to provide support for the rack bar 3 and to bias its teeth into engagement with those of the pinion in conventional manner.

Mounted on the housing 2 in parallel with the rack bar 3 is an auxiliary rack and pinion unit 9 forming part of power assistance means in accordance with the present invention. The unit 9 has an auxiliary housing 10 longitudinally displaceable within which is an auxiliary rack bar 11. Rotatably mounted within the housing 10 is an auxiliary pinion 12, the teeth of which engage a rack 13 on the bar 11 so that rotation of the auxiliary pinion effects in longitudinal displacement of the auxiliary rack bar relative to the housing 10. The auxiliary housing 10 carries a bracket 14 by which the housing 10 is firmly bolted at 15 onto the main housing 2a. An end of the auxiliary rack bar 11 is fitted with a longitudinal extension 11a. The end of the extension 11a outermost from the auxiliary housing 10 has bolted thereto a coupling bracket 16. The bracket 16 extends in sealed manner through the bellows 8 at the adjacent end of the main rack bar 3 and is firmly connected to the main rack bar 3 (conveniently by being clamped between a shoulder adjacent the end of the rack bar 3 and the adjacent ball joint 4).

In the auxiliary housing 10, the auxiliary rack bar 11 is biased for its rack teeth to engage the teeth of the auxiliary pinion by a screw adjustable or spring loaded yoke or bearing 17. The auxiliary pinion 12 has a shaft 18 by which the pinion is rotatably mounted in needle and ball bearings 19 and 20 respectively in opposed walls 21 of the auxiliary housing. The pinion shaft 18 is in the form of a rotor carrying permanent magnets 22 for an electric motor 23. The motor 23 has stator windings 24 clamped between cylindrical flanges 25 of the opposed walls 21 by bolts 26 which extend through the walls 21 and the windings 24.

The electric motor 23 provides the sole input drive to rotate the auxiliary pinion 12 and thereby to displace the auxiliary rack bar 11 and it will be apparent that when the motor 23 is energised the auxiliary rack bar 11 will be displaced longitudinally relative to the housings 10 and 2 and in parallel with the main rack bar 3 so that the latter can be assisted in its longitudinal displacement through the coupling of the brackets 16. Furthermore, the longitudinal direction in which the auxiliary rack bar 11 is displaced will be dependent upon the direction of current flow through the stator windings 24.

The energisation of the electric motor 23 and the direction of current flow through the stator windings 24 is controlled by a rotationally (and possibly torque) responsive switch 27 mounted on or in the coupling to the shaft 6 of the main pinion (conveniently on the steering column 7). The switch 27 is incorporated in the electrical system (shown generally at 28) of a vehicle to which the steering assembly is fitted and reacts so that when the steering column 7 is rotated to rotate the main pinion and drive the main rack bar 3 in one or the opposite sense of direction, current is supplied to the electric motor 23 to rotate the auxiliary pinion 12 and drive the auxiliary rack bar 11 in a corresponding direction to that in which the main rack bar 3 is driven so that the drive imparted by the electric motor applies power assistance in the appropriate direction to the movement of the rack bar 3 and thereby to the steering manoeuvre.

In the event that the electrical system of the vehicle or the electric motor 23 fails, it will be apparent that the main rack and pinion steering gear 1 will function in conventional manner while the auxiliary rack bar 11 is displaced in sympathy with the main rack bar 3 as the pinion rotor shaft merely rotates within the stator windings. It will also be apparent that the auxiliary rack and pinion steering gear 9 can readily be removed for servicing or replacement merely by unbolting the brackets 14 and 16.

Flexible bellows 29 are provided to form a sealed chamber between the auxiliary housing 10 and the auxiliary rack bar 11 or its extension 11a.

If required the auxiliary rack bar 11 can be provided with two extensions, one from each end thereof (similar to the extension 11a), for respective coupling to opposite ends of the main rack bar 3.

I claim:

1. Power assistance means for a rack and pinion steering gear having a main rack bar longitudinally displaceable in a main housing, a main pinion rotatably mounted in the main housing and engaging teeth of the main rack bar, said pinion being rotated in response to a steering input to effect in longitudinal displacement of the rack bar, and wherein the power assistance means comprises an auxiliary rack bar longitudinally displaceable in an auxiliary housing; an auxiliary pinion rotatably mounted in the auxiliary housing and engaging teeth of the auxiliary rack bar; electric motor means carried by the auxiliary housing, said electric motor means providing a sole input drive to rotate the auxiliary pinion for displacing the auxiliary rack bar; mounting means for mounting the auxiliary housing in a fixed position relative to the main housing; coupling means for coupling the auxiliary rack bar for movement in unison with the main rack bar, and switch means for controlling operation of the electric motor means, said switch means being intended to be responsive to the steering input so that the auxiliary rack bar is driven by the electric motor means in unison with the main rack bar to provide power assistance thereto.

2. Power assistance means as claimed in claim 1 in which the auxiliary pinion has a shaft which is comprised in a rotor of the electric motor means, said electric motor means having stator windings carried in the auxiliary housing.

3. Power assistance means as claimed in claim 1 in which the auxiliary housing carries biasing means for biasing the teeth of the auxiliary rack bar into engagement with the auxiliary pinion.

4. Power assistance means as claimed in claim 1 in which the mounting means comprises a bracket on the auxiliary housing for bolting that housing to the main housing.

5. Power assistance means as claimed in claim 1 in which the coupling means comprises a bracket extending from the auxiliary rack bar for securing to the main rack bar.

6. Power assistance means as claimed in claim 1 and comprising bellows extending between the auxiliary housing and the auxiliary rack bar to provide a seal between said components.

7. A rack and pinion steering gear assembly which includes a power assistance means as claimed in claim 1.

8. A rack and pinion steering gear assembly which comprises a main rack bar longitudinally displaceable in a main housing; a main pinion rotatably mounted in the main housing and engaging teeth of the main rack bar, said pinion being rotated in response to a steering input to effect in longitudinal displacement of the rack bar; power assistance means comprising an auxiliary rack bar longitudinally displaceable in an auxiliary housing; an auxiliary pinion rotatably mounted in the auxiliary housing and engaging teeth of the auxiliary rack bar; electric motor means carried by the auxiliary housing and providing a sole input drive to rotate the auxiliary pinion for displacing the auxiliary rack bar; mounting means by which the auxiliary housing is mounted at a fixed position relative to the main housing; coupling means coupling the auxiliary rack bar for movement in unison with the main rack bar, and switch means controlling operation of the electric motor means, said switch means being responsive to the steering input so that the auxiliary rack bar is driven by the electric motor means in unison with the main rack bar to provide power assistance thereto.

9. An assembly as claimed in claim 8 in which the auxiliary housing includes a bracket by which that housing is bolted to the main housing.

10. An assembly as claimed in claim 8 in which the coupling means comprises at least one bracket on the auxiliary rack bar coupled to the main rack bar.

11. An assembly as claimed in claim 10 in which the main rack bar is connected through ball joints to tie rods and the coupling bracket is connected to the main rack bar adjacent to a ball joint.

12. An assembly as claimed in claim 10 in which the main housing is sealed to tie rods extending from the main rack bar by flexible bellows and the coupling bracket extends through said bellows in sealed manner.

13. An assembly as claimed in claims 8 in which the switch means comprises a rotationally or torque responsive switch associated with a rotational steering input for the main pinion to actuate the electric motor means in response to the application of a steering input torque to rotate the main pinion.

14. Power assistance means for use with a rack and pinion steering gear, which rack and pinion steering gear comprises a main housing, a main rack bar longitudinally displaceable in the main housing, and a main pinion mounted in the main housing and having teeth engaging the teeth on the main rack bar to displace the main rack bar upon rotation of the main pinion in response to a steering input applied thereto, said power assistance means comprising:

an auxiliary housing;
an auxiliary rack bar for location spaced transversely from the main rack bar, parallel to the main rack bar and coextensive with said main rack bar, said auxiliary rack bar being longitudinally displaceable in said auxiliary housing;
an auxiliary pinion mounted in said auxiliary housing and having teeth engaging the teeth on said auxiliary rack bar to displace said auxiliary rack bar upon rotation of said auxiliary pinion;
electric motor means located in said auxiliary housing for rotating said auxiliary pinion;
means for releasably mounting said auxiliary housing to the main housing of the rack and pinion steering gear;
means for extending transverse to the direction of longitudinal displacement of said main and auxiliary rack bars for coupling said auxiliary rack bar to the main rack bar of the rack and pinion steering gear for unitary movement of said auxiliary rack bar and the main rack bar of the rack and pinion steering gear; and
switching means for actuating said electric motor means in response to the steering input to effect rotation of said auxiliary pinion to cause displacement of said auxiliary rack bar and the main rack bar of the rack and pinion steering gear to thereby provide power assistance to displacement of the main rack bar of the rack and pinion steering gear.

15. A rack and pinion steering gear assembly comprising:

a main housing;
a main rack bar longitudinally displaceable in the main housing;
a main pinion mounted in the main housing and having teeth engaging the teeth on the main rack bar to displace the main rack bar upon rotation of the main pinion in response to a steering input applied thereto;
an auxiliary housing;
an auxiliary rack bar spaced transversely from the main rack bar, parallel to the main rack bar and coextensive with said main rack bar, said auxiliary rack bar being longitudinally displaceable in said auxiliary housing;
an auxiliary pinion mounted in said auxiliary housing and having teeth engaging the teeth on said auxiliary rack bar to displace said auxiliary rack bar upon rotation of said auxiliary pinion;
electric motor means located in said auxiliary housing for rotating said auxiliary pinion;
mean releasably mounting said auxiliary housing to the main housing of the rack and pinion steering gear;
means extending transverse to the direction of longitudinal displacement of said main and auxiliary rack bars for coupling said auxiliary rack bar to the main rack bar of the rack and pinion steering gear for unitary movement of said auxiliary rack bar and the main rack bar of the rack and pinion steering gear; and switching means for actuating said electric motor means in response to the steering input to effect rotation of said auxiliary pinion to cause displacement of said auxiliary rack bar and the main rack bar of the rack and pinion steering gear to thereby provide power assistance to displacement of the main rack bar of the rack and pinion steering gear.

* * * * *